United States Patent [19]

Ishimaru et al.

[11] Patent Number: 4,594,054
[45] Date of Patent: Jun. 10, 1986

[54] ION PUMP

[75] Inventors: Hajime Ishimaru; Katsuya Narushima; Takashi Momose, all of Sakura, Japan

[73] Assignee: Hajime Ishimaru, Ibaraki, Japan

[21] Appl. No.: 553,241

[22] Filed: Nov. 18, 1983

[30] Foreign Application Priority Data

Dec. 28, 1982 [JP] Japan .............................. 57-232749

[51] Int. Cl.⁴ ............................................ F04B 37/02
[52] U.S. Cl. ....................................... 417/49; 417/53
[58] Field of Search .............................. 417/49, 53, 54

[56] References Cited

U.S. PATENT DOCUMENTS 3,994,625 11/1976 Welch .................................. 417/49
4,097,195 6/1978 Hill ...................................... 417/49

Primary Examiner—Edward K. Look
Attorney, Agent, or Firm—Robert E. Burns; Emmanuel J. Lobato; Bruce L. Adams

[57] ABSTRACT

An ion pump comprises a pump casing inserted in a magnetic field, with an anode supported by insulators in the pump casing. Both the pump casing and anode are made of alminum-based metals, and the pump casing serves also as a cathode, thereby the ion pump has a simpler structure and functions more efficiently than the conventional ones.

16 Claims, 5 Drawing Figures

U.S. Patent   Jun. 10, 1986   4,594,054 ing the structure of a conventional ion pump.
ION PUMP

BACKGROUND OF THE INVENTION

1. Field of the Invention

This invention relates to an ion pump, and more particularly to an ion pump that is made to a simpler design using better-suited materials than conventional ion pumps.

2. Description of the Prior Art

FIG. 1 shows an example of conventional ion pumps, which comprises a magnet 1 and a stainless steel pump casing 2, with part 2a of the latter extending into the magnetic field generated by the former. The part 2a contains a stainless steel anode 3 and a titanium cathode 4.

As a result of Penning discharge, titanium atoms are spattered and stick to the internal surface of the pump casing 2. The active titanium atoms adsorb gas molecules in the pump casing 2.

With the gas in the pump casing 2 thus eliminated or evacuated, a given vessel (not shown) communicating with the pump casing 2 is also evacuated to establish a high degree of vacuum therein.

Made of stainless steel and titanium, conventional ion pumps must, in application of heat treatment, be kept at a high temperature not lower than 450° C. for a long time (approximately 48 hours). Another problem is the extremely high cost of titanium cathodes.

SUMMARY OF THE INVENTION

Th object of this invention is to offer solutions to these problems. More specifically, the objects of this invention are to provide an ion vacuum pump that is made of better-suited materials, has a simpler structure, and functions more efficiently than the conventional ones.

In order to achieve the foregoing objects, an ion vacuum pump according to this invention comprises a pump casing inserted in a magnetic field, with an anode supported by insulators in the pump casing. Both the casing and anode are made of aluminum-based metals. The whole of the pump casing serves also as a cathode.

It is preferable that the aluminum-based metal of which the pump casing is made contains a trace of titanium, zirconium or magnesium.

With the low-cost aluminum-based metal pump casing the whole of which serves as a cathode, the ion pump of this invention performs efficient evacuation without using the costly titanium cathode that has been indispensable to the conventional ion pumps.

With the ion vacuum pump of this invention, not only the pump casing but also the anode is made of an aluminumbased metal. As a consequence, less gases are desorbed or extracted from the surface thereof during evacuation, which, in turn, permits lowering the temperature of baking, which is applied as a pretreatment, to as low a level as between approximately 120° and 150° C. and shortening the baking time to approximately 24 hours.

The ion vacuum pump of this invention requires only an anode in the pump casing because the pump casing itself serves as a cathode. This design permits reducing the distance between the two electrodes, whereby the required magnetic field can be generated with the use of a smaller magnet.

The ion vacuum pump according to this invention finds use in such applications as a particle accelerator and nuclear fusion reactor. Because the pump casing and anode are made of aluminum-based metals, radioactivity in the pump decays much more rapidly than in the conventional pumps made of stainless steel, which results in a safer working environment for the operators. The high thermal conductivity of aluminum-based metals assures prompt cooling and allows the pump to be used safely even in intensely heated places.

DESCRIPTION OF THE PREFERRED EMBODIMENTS

Figure 1:
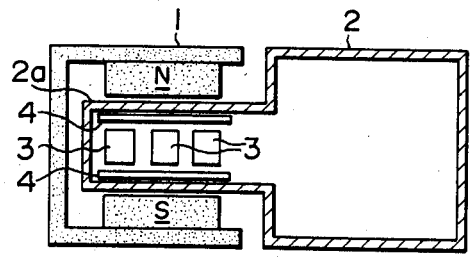
FIG. 1 is a cross-sectional view schematically showing the structure of a conventional ion pump.

Referring now to the drawings, preferred embodiments of this invention will be described hereinafter.

Figure 2:
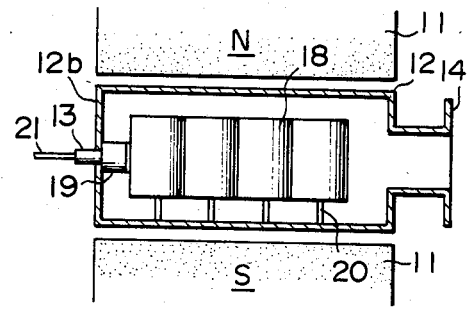
FIG. 2 is a cross-sectional view schematically showing the structure of an ion pump according to this invention.
Figure 3:
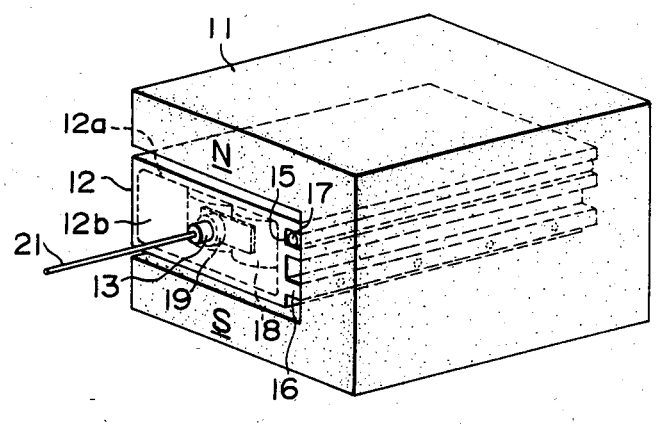
FIG. 3 is a perspective view of the ion pump shown in FIG. 2.
Figure 4:
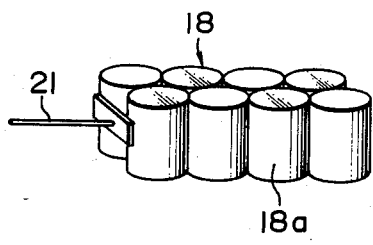
FIG. 4 is a perspective view of an anode used therewith.

As illustrated in FIGS. 2 through 4, a pump casing 12 is placed in a magnetic field between the poles N and S of a permanent magnet 11. A high-voltage feedthrough 13 is attached to one end of the pump casing 12, and a flange 14 adapted for connection to an accelerator or other vacuum vessel is provided at an opening at the other end thereof.

The pump casing 12 is made of an aluminum-based metal. A billet is heated to approximately 500° C. and extruded into a seamless pipe that has an internal cross section 12a indicated by a broken line in FIG. 3. An end wall 12b having said high-voltage feedthrough 13 is welded to one end of the pipe and the flange 14 is formed at the other end.

In extruding the pump casing 12, a heater groove 15 and a longitudinal beam 16 adapted to carry a magnet are formed. An electric sheath heater 17 is put in the heater groove 15 and the permanent magnet 11 is bolted or otherwise fastened to the beam 16.

An anode 18 is supported in the pump casing 12 with ceramic insulators 19, 20 placed therebetween. A high-voltage wire 21 leading from the high-voltage feedthrough 13 to the anode 18 is contained in the insulator 19.

The anode 18 consists of a plurality of cylinders 18a fabricated from an aluminum-based metal sheet as shown in FIG. 4.

Figure 5:
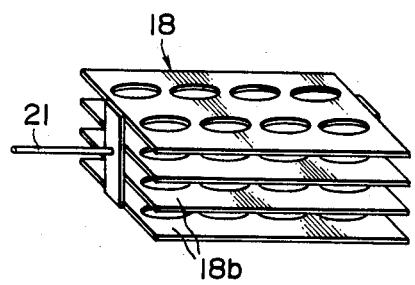
FIG. 5 is a perspective view showing another embodiment of the anode.

The anode 18 may also be formed by laying multiperforated sheets 18b of an aluminum-based metal one over another, with a thin spacer inserted therebetween, as shown in FIG. 5.

With the ion pump of this invention, the pump casing 12 serves also as a cathode, in other words, the entire pump casing functions as a cathode, and, therefore, is connected to a ground wire not shown.

Both the pump casing/cathode 12 and anode 18 can be made of either pure aluminum or an appropriate type of aluminum alloy. It is preferable for the aluminum-based metal of which the pump casing/cathode 12 which serves also as a cathode is made to contain a trace amount (0.1 to 1.0 percent by weight) of titanium, zirconium or magnesium.

The ion vacuum pump of this invention as aforedescribed is connected through the flange 14 to a vessel to be evacuated. While heating (at 120° to 150° C.) is effected by passing electricity through the sheath heater 17 for approximately 24 hours, the vessel is evacuated using an auxiliary pump not shown. By so doing, a vaccuum of approximately $10^{-5}$ to $10^{-7}$ torr is maintained. The hydro-oxides and adsorbed gases on the internal wall surfaces of the pump casing/cathode 12 and the surface of the anode 18 are extracted from the surfaces by being decomposed or vaporized as a result of the heating and evacuated by said auxiliary pump.

As the pump casing 12 and anode 18 are composed of aluminum-based metals whose thermal conductivities are high, the heating need not be continued over a prolonged period because the moisture contained in a film of aluminum oxide ($Al_2O_3$) formed at the surface is thoroughly removed when heated to a temperature between approximately 120° and 150° C.

Aluminum-based metals have another advantage over stainless steel in that they release less gases.

Then, Penning discharge is conducted by applying a high d.c. voltage (approximately 5.5 kv) to the anode 18, with the result that the pump casing 12, which serves as the cathode, releases electrons which spiral in the magnetic field. On colliding with, for instance, nitrogen molecules in the pump casing 12, the electrons yield nitrogen ions and new electrons.

The positively charged ions of nitrogen thus formed collide with, and get absorbed by, the internal walls of the pump casing 12 that serves as the cathode. Consequently, atoms of aluminum and titanium (or zirconium or magnesium) contained in the pump casing 12 are adsorbed, which, however, stick to the surface of the anode 18 or the internal walls of the pump casing 12 later.

The active aluminum and titanium atoms, etc. sticking to the internal walls of the pump casing 12 as a result of spattering efficiently adsorb gas molecules in the pump casing 12. It has been experimentally confirmed that a vacuum as high as approximately $10^{-10}$ torr can be attained easily through the elimination or evacuation of the internal gases.

What is claimed is:

1. An ion pump comprising: a pump casing placed in a magnetic field, the pump casing having an outer surface in which is provided a heater groove, an electric sheath heater disposed in the heater groove for baking, an anode supported by insulators within the pump casing, the pump casing and anode both being made of aluminum-based metals, and the whole of the pump casing serving also as a cathode.

2. An ion pump according to claim 1, in which the aluminum-based metal of which the pump casing is made contains a trace of titanium, zirconium or magnesium.

3. In an ion vacuum pump: means for generating a magnetic field; an evacuable pump casing disposed within the magnetic field; an anode supported within the pump casing; a cathode disposed in spaced relation from the anode, the cathode consisting of the pump casing; and the pump casing/cathode and anode both consisting essentially of aluminum-based metals.

4. An ion pump according to claim 3; wherein the pump casing/cathode consists essentially of aluminum-based metal containing a trace amount of titanium, zirconium or magnesium.

5. An ion pump according to claim 4; wherein the trace amount is present in an amount of 0.1 to 1.0 percent by weight.

6. An ion pump according to claim 4; wherein the pump casing/cathode comprises a seamless extruded one-piece structure.

7. An ion pump according to claim 6; wherein the pump casing/cathode one-piece structure has at least a pair of opposed side walls; means defining a groove extending along one side wall; and an electric sheath heater disposed in the groove for baking the pump casing/cathode and anode.

8. An ion pump according to claim 3; wherein the pump casing/cathode comprises a seamless extruded one-piece structure.

9. An ion pump according to claim 8; wherein the pump casing/cathode one-piece structure has at least a pair of opposed side walls; means defining a groove extending along one side wall; and an electric sheath heater disposed in the groove for baking the pump casing/cathode and anode.

10. A method of pretreating an ion vacuum pump prior to operation thereof, comprising the steps of: providing an ion vacuum pump having a pump casing/cathode structure which functions both as the pump casing and the cathode and in which is supported an anode, both the pump casing/cathode and anode consisting essentially of aluminum-based metals; baking the pump casing/cathode and anode at a temperature no greater than approximately 150° C. for a length of time sufficient to extract hydroxides and adsorbed gases from the surfaces of the pump casing/cathode and anode; and evacuating the extracted hydroxides and gases from within the pump casing/cathode.

11. A method according to claim 10; wherein the baking step is carried out at a temperature in the range of 120° to 150° C.

12. A method according to claim 11; wherein the baking step is carried out for a length of time no longer than 30 hours.

13. A method according to claim 12; wherein the baking step is carried out for approximately 24 hours.

14. A method according to claim 12; wherein the baking step comprises applying heat energy to the pump casing/cathode and anode by an electric sheath heater disposed in a groove extending along an outside surface of the pump casing/cathode to effect the extraction of the hydroxides and adsorbed gases.

15. A method according to claim 11; wherein the baking step comprises applying heat energy to the pump casing/cathode and anode by an electric sheath heater disposed in a groove extending along an outside surface of the pump casing/cathode to effect the extraction of the hydroxides and adsorbed gases.

16. A method according to claim 10; wherein the baking step comprises applying heat energy to the pump casing/cathode and anode by an electric sheath heater disposed in a groove extending along an outside surface of the pump casing/cathode to effect the extraction of the hydroxides and adsorbed gases.

* * * * *